June 8, 1943. H. W. SPICER 2,321,257
GASKET
Filed April 8, 1940

INVENTOR
Harold W. Spicer
BY Nathaniel Ely
ATTORNEY

Patented June 8, 1943

2,321,257

UNITED STATES PATENT OFFICE 2,321,257

GASKET

Harold W. Spicer, Dunellen, N. J., assignor of one-half to A. A. Whitford, Dunellen, N. J.

Application April 8, 1940, Serial No. 328,443

4 Claims. (Cl. 106—253)

This invention relates to improvements in gaskets and gasket materials especially for sealing fluid joints which may be hot or cold.

The use of gaskets and gasket materials for sealing joints subjected to fluid pressure is well known. However, in many places, such as in the exhaust manifold and in the cylinder head of automotive and other internal combustion engines, the high temperatures of the gases have been particularly troublesome as the gaskets quickly oxidize or burn out. This is more serious at this time as the present-day high compression motors use fuel which has a delayed burning rate to avoid detonation and the temperature of the exhaust is greatly increased thereby. This has seriously shortened the effective life of gaskets in the exhaust manifold and in the cylinder head. In trucks, where operating conditions are especially severe, the frequent replacement of gaskets has been a cause of considerable expense due to the necessary delay required for repairs. Similar conditions have been experienced in other fields, and, although many forms of gasket have been suggested, none is known at this time which has any substantial resistance to oxidation.

One of the principal objects of my invention is to provide a gasket for use under conditions of relatively high temperature gas sealing, such gasket being of a mineral substance which is unaffected by the hot gas and which will effectively resist oxidation.

Another object of my invention is to provide a gasket having a flexible base of a metallic or non-metallic material to establish the shape of the gasket, such base being covered by a gas-resisting coating which prevents the oxidation or destruction of the gasket in high temperature service.

Another object of my invention is to provide an improved composition of matter for gaskets and a method of making the gasket which consists principally of a heat and oxygen-resisting mineral material and a second material which balances the shrinkage of the mineral material to form a constant mass product, such product being mixed with a fluid and ground to a jelly-like or paste consistency that can be applied to a joint directly or to a gasket base whereby the gasket surfaces or the joint surfaces are protected against oxidation and other deleterious heat effects.

A still further object of this invention is to provide an improved form of gasket material which is relatively resilient and non-shrinking and is particularly adapted for placing between metallic surfaces, which may be subjected to warping or misalignment, for maintaining a fluid-tight joint therebetween.

Further objects and advantages of my invention will appear from the following description of preferred forms of embodiment thereof taken in conjunction with the drawing attached hereto, and in which Fig. 1 is a plan view of a circular gasket;

Figure 1:
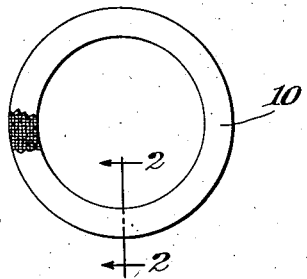
Figure 2:
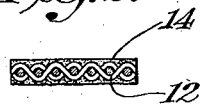
Fig. 2 is an enlarged transverse section of the gasket shown in Fig. 1 and taken on the line 2—2 thereof.
Figure 4:
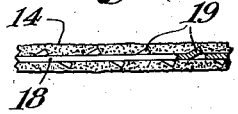
Fig. 4 is a view similar to Fig. 2 showing a modified form of gasket.

In accordance with the preferred form of embodiment of my invention, I have provided a gasket, which may be of a circular type as indicated at 10 in Fig. 1, or of any other shape, and which consists essentially of a base 12 as indicated in Fig. 2 and a coating 14, which completely surrounds the base material. The base material 12 may be a ferrous or non-ferrous or a non-metallic material and its particular characteristic is that it establishes the size and shape of the gasket and permits the handling and storage of the gasket as a separate article of commerce.

Figure 3:
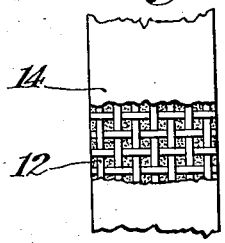
Fig. 3 is a plan view on an enlarged scale of the gasket base before coating.
Figure 5:
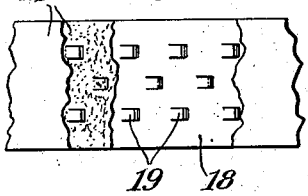
Fig. 5 is a plan view on an enlarged scale of the gasket base before coating.
Figure 6:
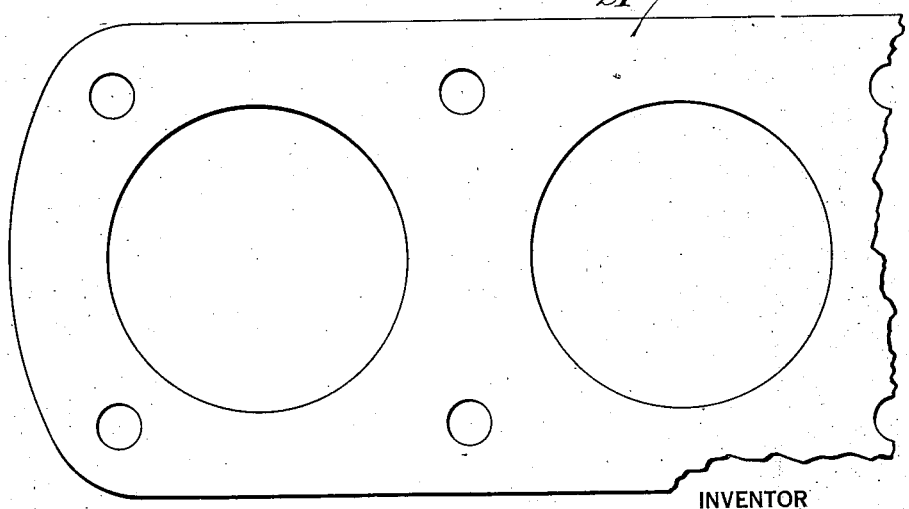
Fig. 6 is a partial plan view of a multi-ported gasket.

Preferably, the base is a woven wire material, as generally indicated in Figs. 2 and 3, or it may be a foraminous plate, generally indicated at 18 in Fig. 5, or it may be a perforated plate. As will be hereinafter pointed out, the base is so coated as to be completely free of contact with destructive gases and, therefore, may be of steel or other ferrous material or alloy or a non-ferrous alloy of copper, or it may be non-metallic and may be of any desired thickness to provide stability. When a plate is used as a base, as distinguished from a woven material, I prefer to use offset projections as indicated at 19, which may be of any desired shape, which will permit the bonding of the coating material hereinafter described. A perforated plate may also be used. The ferrous base material is considerably cheaper than the heretofore available materials and when coated, as hereinafter described, will be more satisfactory than materials now available.

The purpose of the coating is to avoid any possible contact between the internal gases or the external gases or atmosphere and the base material for it is my observation that the serious destruction of gaskets, when used in locations where there is high temperature gas, is due to the oxidation, erosion, or burning of the metal. This is not necessarily due to hot gases directly, as in exhaust manifolds I find the greatest oxidation on the outside where the air comes in contact with the metal, which is heated by the hot internal gas. While I do not wish to be limited to any theory of operation, I have found that after relatively short periods of operation, the customary metal gaskets become melted or burned away, usually from the outside, thereby leaving an opening for the escape of gases. In exhaust manifold gaskets, this causes an objectionable noise and permits escape of poisonous gases and may destroy the joint itself. In cylinder head constructions, the destruction of the gasket causes loss of compression with all its attendant operating difficulties and is especially objectionable if the gasket blows through between adjacent cylinders, or into the water jacket.

The coating material 14, in accordance with my invention, therefore completely embraces the base irrespective of the form or shape of the base and irrespective of whether it is non-metallic or metallic. This not only avoids any possible contact of the gases with the base, but assures a complete contact of the joint parts with the gasket coating material for the necessary fluid-tight seal. This coating material is thus free to resist the gases and the temperature and pressure conditions, but need not have any independent strength, which is a function of the base material. The gases referred to are not only the confined gases, but also the atmosphere, the oxygen in which causes burning or deterioration of exposed hot metal.

I have found that a gasket material, which is provided with a substantial proportion of asbestos together with a shrinkage balancing agent, can be applied to a base material in such a manner that a non-shrinking and heat and oxidation-resisting gasket is formed. The coating product which I prefer to use for the maximum temperatures, which may be in the range of 1600–1800° F., or more, has the following composition:

|                                                                  | Parts by weight |
|------------------------------------------------------------------|-----------------|
| Asbestos furnace cement (principally asbestos)                   | 50              |
| Asbestine (finely ground soapstone)                              | 50              |
| Binder (linseed oil, mineral oil, used crankcase oil).           |                 |

The soapstone has the especial advantage of balancing the natural shrinkage of asbestos, which has heretofore been used, but has been unsatisfactory due to the high shrinkage. This balancing of mass is very important to avoid any possible change of surface coating as any crack will immediately expose the hot base to oxygen carrying gases. These ingredients are mixed and ground to a smooth consistency somewhat like a petroleum jelly or paste and are thereafter applied to the base material by any suitable manner such as with a pressure gun, coating machine, or even by painting, so as to establish the uniformity of thickness for the ultimate gasket. With a drying oil such as linseed oil, the gasket may be baked or calendered in such a manner as to obtain a relatively stable gasket of the desired shape, which is suitable for handling, storage, and the usual commercial sale to which such gaskets are placed. Such a gasket is completely water-resistant.

I have also found, however, that the application of this gasket coating to a joint which runs hot can be satisfactorily effected by the use of mineral oil or used crankcase oil, which will be evaporated under the temperature conditions of the joint, and the carbon formed thereby is helpful. The gasket coating material in such case is blended and immediately installed in the joint.

It is not essential that a base be used, nor that a drying oil be used for with other oils the gasket coating is relatively tacky and will adhere to the joint face, thereby facilitating assembly. It will not become firmly bonded to the joint in service, however, which permits the ready disassembly of the joint and the complete removal of the gasket material.

My gasket material is relatively flexible and non-shrinking as contrasted to the usual forms of gasket material, which is due to the presence of a substantial amount of counterbalancing material, which is also preferably mineral, where high temperatures are experienced. Leaking in service with my gasket material is eliminated and subsequent tightening up of the joint is not necessary, and this is the result of having a relatively flexible material which tends to follow the joint surfaces. There is no loss of sealing effect, even on uneven expansion of the joint parts which tends to cause warping. The gasket coating has also been used satisfactorily between joint surfaces, one of which was rough cast and the other of which was machined. I also find that the gasket material can be applied in a much thinner and equally successful coating without the base, and in such case the initial design of joints for gasket thickness can be neglected.

If the gasket material need not have such a high temperature resistance and where the gasket is to be used in service to confine fluids other than water and steam and especially for service with oils, grease, etc., as in oil pumps, oil pans, gear cases, etc., a modified composition can be used. The materials in this form are as follows:

|                                                  | Parts by weight |
|--------------------------------------------------|-----------------|
| Asbestos                                         | 7               |
| Wheat flour                                      | 7               |
| Sugar                                            | 16              |
| Water                                            | 17              |
| Anti-fermenting agent of the phenol or similar base. |             |

These ingredients are blended as follows: The sugar and water are cooked about 10 minutes to a syrupy mass and the water which is evaporated during heating is replaced. The flour and asbestos are then blended into the sugar solution and the mixture is then ground in a wet condition to a jelly-like consistency, which may be applied directly to the joint or to the gasket base. In this case, the asbestos is the heat-resisting mineral material and the wheat flour serves as the shrinkage balancing material. The sugar and water serve as a binder and make the desired pasty consistency so that the material can be spread.

The amount of anti-fermenting material can readily be determined, it being understood that the sugar mass would otherwise ferment.

Such a gasket material will stand a temperature in the range of 500–600° F. and is slightly water soluble.

The gasket materials are inexpensive and simply made and durable over long periods. The oil type, on test, has shown hundreds of hours of resistance to the continuous exposure of the heat of exhaust gases of a heavy-duty truck motor, which was operated with an exceedingly high exhaust temperature. No deterioration was observed and the metal base was found to be completely covered after such rigorous service. In the water type, in which I have merely painted the asbestos material on the joint, there has been no breakdown under ordinary service after many months of operation, where it has been applied to oil pans, axle housings, etc. It is to be appreciated that the gasket material is equally as satisfactory with low temperature joints subject to fluids, which may or may not be corrosive, or solvents, as it is in the high temperature joints. In both cases, the gasket coating or the gasket including the base and coating retains its flexibility after continued use and does not become brittle nor hard. It conforms to the surface to which applied, as can be seen when it is applied to a woven wire base, which it penetrates and, after repeated flexing, does not crack away or separate.

While I have shown and described preferred forms of embodiment of my invention, I am aware that other modifications may be made thereto, and I, therefore, desire a broad interpretation thereof within the scope and spirit of the description herein and of the claims appended hereinafter.

I claim:

1. A gasket material comprising substantially equal parts of finely ground asbestos and ground soapstone, said soapstone being a shrinkage balancing material which counteracts the normal shrinkage of asbestos from wet to dry condition whereby said material will have a substantially constant mass wet or dry, and a binder to render said mixture plastic.

2. A composition of matter comprising substantially equal parts of asbestos and soapstone, together with a sufficient amount of an oil to render the ground asbestos and soapstone cohesive, plastic, and slightly tacky, and non-shrinking on drying.

3. A gasket comprising a base material coated with the composition of matter claimed in claim 2, and being resistant to oxidation and deterioration when hot.

4. A gasket comprising a metal base material coated with the composition of matter as claimed in claim 2.

HAROLD W. SPICER.